United States Patent
Wu et al.

(10) Patent No.: US 10,969,580 B2
(45) Date of Patent: Apr. 6, 2021

(54) DISPLAY APPARATUS INCLUDING ADJUSTABLE OPTICAL DEVICE AND DISPLAY METHOD

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Peng Wu, Beijing (CN); Lingyu Sun, Beijing (CN); Bin Long, Beijing (CN); Zhipeng Zhang, Beijing (CN); Donglong Lin, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 428 days.

(21) Appl. No.: 15/770,981

(22) PCT Filed: Sep. 20, 2017

(86) PCT No.: PCT/CN2017/102950
§ 371 (c)(1),
(2) Date: Apr. 25, 2018

(87) PCT Pub. No.: WO2018/133438
PCT Pub. Date: Jul. 26, 2018

(65) Prior Publication Data
US 2020/0249476 A1    Aug. 6, 2020

(30) Foreign Application Priority Data
Jan. 20, 2017  (CN) .......................... 201710051517.7

(51) Int. Cl.
G09G 5/00     (2006.01)
G02B 27/01    (2006.01)
G02B 3/00     (2006.01)

(52) U.S. Cl.
CPC ........ *G02B 27/0101* (2013.01); *G02B 3/0056* (2013.01); *G02B 27/0179* (2013.01); *G02B 2027/0185* (2013.01)

(58) Field of Classification Search
CPC .............. G02B 27/0101; G02B 3/0056; G02B 27/0179; G02B 2027/0185
(Continued)

(56) References Cited

U.S. PATENT DOCUMENTS

| 5,880,711 A | 3/1999 | Tamada |
| 2013/0027522 A1* | 1/2013 | Yamada ................. G03B 35/10 348/47 |

(Continued)

FOREIGN PATENT DOCUMENTS

| CN | 101349790 A | 1/2009 |
| CN | 103439801 A | 12/2013 |

(Continued)

OTHER PUBLICATIONS

First Chinese Office Action dated Mar. 13, 2019.
Second Chinese Office Action dated Oct. 29, 2019.
International Search Report dated Dec. 27, 2017.

*Primary Examiner* — Jonathan M Blancha
(74) *Attorney, Agent, or Firm* — Dilworth & Barrese, LLP.; Michael J. Musella, Esq.

(57) ABSTRACT

A display apparatus and a display method are provided. The display apparatus includes: a display device and an adjustable optical device, the display device includes a display screen, configured to display an image; the adjustable optical device is located at a side of the display screen which is used to display, the adjustable optical device is configured to (Continued)

adjust a distance between the display screen and a virtual image of the image formed by the adjustable optical device.

11 Claims, 3 Drawing Sheets

(58) Field of Classification Search
USPC .............................................................. 345/7
See application file for complete search history.

(56) References Cited

U.S. PATENT DOCUMENTS

| | | | |
|---|---|---|---|
| 2014/0300711 A1* | 10/2014 | Kroon | H04N 13/144 |
| | | | 348/51 |
| 2016/0139411 A1 | 5/2016 | Kang et al. | |
| 2016/0193104 A1 | 7/2016 | Du | |
| 2016/0327793 A1 | 11/2016 | Chen et al. | |
| 2017/0003230 A1* | 1/2017 | Park | G01N 21/9501 |
| 2017/0195661 A1 | 7/2017 | Du et al. | |
| 2017/0264891 A1* | 9/2017 | Iwasaki | G02B 30/27 |
| 2017/0343799 A1* | 11/2017 | Ito | G02B 27/0101 |

FOREIGN PATENT DOCUMENTS

| | | |
|---|---|---|
| CN | 106710497 A | 5/2015 |
| CN | 105096313 A | 11/2015 |
| CN | 105653227 A | 6/2016 |
| CN | 105872716 A | 8/2016 |
| CN | 105929534 A | 9/2016 |
| CN | 106199958 A | 12/2016 |
| CN | 106254753 A | 12/2016 |
| JP | 2014103228 A | 7/2014 |
| WO | 2016038997 A1 | 3/2016 |

\* cited by examiner

DISPLAY APPARATUS INCLUDING ADJUSTABLE OPTICAL DEVICE AND DISPLAY METHOD

The present application claims priority of China Patent application No. 201710051517.7 filed on Jan. 20, 2017, the content of which is incorporated in its entirety as portion of the present application by reference herein.

TECHNICAL FIELD

At least one embodiment of the present disclosure relates to a display apparatus and a display method.

BACKGROUND

With the popularity of display apparatuses, more and more occasions in people's lives need display apparatuses, which include televisions, computers, mobile phones, tablets and so on. People spend a lot of time using these electronic products in a day, so it is easy to have a great impact on people's eyesight, especially for many young people. Using electronic products for a long time or watching televisions and computers at a close distance for a long time can lead to eye overuse, so as to result in myopia. Therefore, the development of display apparatuses for eye protection has profound significance.

SUMMARY

At least one embodiment of the present disclosure provides a display apparatus and a display method. The display apparatus can be utilized to achieve a role of eyesight protection.

At least one embodiment of the present disclosure provides a display apparatus, the display apparatus includes: a display device and an adjustable optical device. The display apparatus includes a display screen, configured to display an image; the adjustable optical device, located at a side of the display screen which is used to display, the adjustable optical device is configured to adjust a distance between the display screen and a virtual image of the image formed by the adjustable optical device.

For example, in the display apparatus provided by an embodiment of the present disclosure, the display apparatus further includes: a distance detector, configured to detect a real distance between a current user and the display screen; and a controller, communicated with the distance detector, configured to receive a data signal detected by the distance detector and judge and calculate the data signal to obtain a control signal, the adjustable optical device is communicated with the controller, the adjustable optical device is configured to locate the virtual image at a position where the display screen is located or a side of the display screen away from the adjustable optical device, and adjust a distance between the virtual image and the current user according to the control signal.

For example, in the display apparatus provided by an embodiment of the present disclosure, the distance between the current user and the virtual image is a viewing distance, the distance between the virtual image and the display screen is a correction distance of the adjustable optical device, and the viewing distance is a sum of the real distance and the correction distance, a maximum correction distance of the adjustable optical device is Dc, and Ds is two times of a diagonal of the display screen, the controller includes a comparator, the comparator is configured to output a comparison result upon determining that the real distance is less than the Ds and not less than Ds-Dc, and the controller controls the adjustable optical device to make the viewing distance not less than the Ds according to the comparison result.

For example, in the display apparatus provided by an embodiment of the present disclosure, the distance between the current user and the virtual image is a viewing distance, the distance between the virtual image and the display screen is a correction distance of the adjustable optical device, and the viewing distance is a sum of the real distance and the correction distance, a maximum correction distance of the adjustable optical device is Dc, Ds is two times of a diagonal of the display screen, and the Dc is less than the Ds, the adjustable optical device includes a warning lamp, the controller includes a comparator, the comparator is configured to output a comparison result upon determining that the real distance is less than Ds-Dc, and the controller controls the warning lamp to light for warning according to the comparison result.

For example, in the display apparatus provided by an embodiment of the present disclosure, the adjustable optical device includes a plurality of micro lens groups arranged in an array, the plurality of micro lens groups are configured to adjust a focal length to adjust the distance between the virtual image and the display screen, and a distance between the display screen and the plurality of micro lens groups is less than the focal length of the plurality of micro lens groups.

For example, in the display apparatus provided by an embodiment of the present disclosure, each group of the plurality of micro lens groups includes a first convex lens, a second convex lens, and a concave lens between the two convex lenses, and at least one of the three lenses is movably disposed to make distances among the three lenses adjustable.

For example, in the display apparatus provided by an embodiment of the present disclosure, each group of the plurality of micro lens groups includes the first convex lens and the second convex lens which are stationary, and the concave lens which is movable, and the concave lens is configured to move along a direction going close or away from the first convex lens.

At least one embodiment of the present disclosure provides a display method, the display method includes: displaying an image through a display screen; and forming a virtual image of the image through an adjustable optical device disposed on a side of the display screen which is used to display, wherein the adjustable optical device is configured to adjust a distance between the virtual image and the display screen.

For example, in the display method provided by an embodiment of the present disclosure, the display method further includes: detecting a real distance between a current user and the display screen; and forming the virtual image of the image at a position where the display screen is located or a side of the display screen away from the adjustable optical device through the adjustable optical device, wherein the adjustable optical device adjusts a distance between the virtual image and the current user according to the real distance.

For example, in the display method provided by an embodiment of the present disclosure, the distance between the current user and the virtual image is a viewing distance, the distance between the virtual image and the display screen is a correction distance of the adjustable optical device, and the viewing distance is a sum of the real distance and the correction distance, a maximum correction distance of the adjustable optical device is Dc, and Ds is two times of a diagonal of the display screen; upon the real distance being greater than the Ds, the virtual image is located at the position where the display screen is located.

For example, in the display method provided by an embodiment of the present disclosure, the distance between the current user and the virtual image is a viewing distance, the distance between the virtual image and the display screen is a correction distance of the adjustable optical device, and the viewing distance is a sum of the real distance and the correction distance, a maximum correction distance of the adjustable optical device is Dc, and Ds is two times of a diagonal of the display screen; upon the real distance being less than the Ds and not less than Ds-Dc, the adjustable optical device adjusts the viewing distance to be not less than the Ds according to the real distance.

For example, in the display method provided by an embodiment of the present disclosure, the adjustable optical device includes a warning lamp, the distance between the current user and the virtual image is a viewing distance, the distance between the virtual image and the display screen is a correction distance of the adjustable optical device, and the viewing distance is a sum of the real distance and the correction distance, a maximum correction distance of the adjustable optical device is Dc, Ds is two times of a diagonal of the display screen, and the Dc is less than the Ds, upon the real distance being less than Ds-Dc, the warning lamp lights for warning.

For example, in the display method provided by an embodiment of the present disclosure, the adjustable optical device includes a plurality of micro lens groups arranged in an array, the distance between the virtual image and the display screen is adjusted by adjusting a focal length of the plurality of micro lens groups, and a distance between the display screen and the plurality of micro lens groups is less than the focal length of the plurality of micro lens groups.

For example, in the display method provided by an embodiment of the present disclosure, each group of the plurality of micro lens groups includes a first convex lens, a second convex lens, and a concave lens between the two convex lenses, and at least one of the three lenses is movably disposed to make distances among the three lenses adjustable.

For example, in the display method provided by an embodiment of the present disclosure, each group of the plurality of micro lens groups includes the first convex lens and the second convex lens which are stationary, and the concave lens which is movable, and the concave lens is controlled to move along a direction going close or away from the first convex lens to adjust the focal length.

At least one embodiment of the present disclosure provides a display apparatus, the display apparatus includes: a display device, including a display screen, configured to display an image; a distance detector, configured to detect a real distance between a current user and the display screen; a controller, communicated with the distance detector, and configured to receive a data signal detected by the distance detector and judge and calculate the data signal to obtain a control signal; and an adjustable optical device, communicated with the controller, and located at a side of the display screen which is used to display, the adjustable optical device is configured to locate a virtual image of the image formed by the adjustable optical device at a position where the display screen is located or a side of the display screen away from the adjustable optical device, and adjust a distance between the virtual image and the current user according to the control signal.

BRIEF DESCRIPTION OF THE DRAWINGS

In order to clearly illustrate the technical solution of embodiments of the present disclosure, the drawings of the embodiments will be briefly described in the following, it is obvious that the drawings in the description are only related to some embodiments of the present disclosure and not limited to the present disclosure.

FIG. 2b is a sectional view along an AB direction in FIG. 2a;

DETAILED DESCRIPTION

In order to make objects, technical details and advantages of the embodiments of the present disclosure apparently, the technical solutions of the embodiments will be described in a clearly and fully understandable way in connection with the drawings related to the embodiments of the present disclosure. It is obvious that the described embodiments are just a part but not all of the embodiments of the present disclosure. Based on the described embodiments herein, a person having ordinary skill in the art may obtain other embodiment(s), without any inventive work, which should be within the scope of the disclosure.

Unless otherwise defined, the technical terms or scientific terms used herein have the same meanings as commonly understood by one of ordinary skill in the art to which the present disclosure belongs. The terms "first", "second", etc., which are used in the description and the claims of the present disclosure, are not intended to characterize any sequence, amount or importance, but distinguish various components. The terms "includes", "including", etc., are intended to specify that the elements or the objects stated before these terms encompass the elements or the objects and equivalents thereof listed after these terms, but do not preclude the other elements or objects. "On", "under", "right", "left" and the like are only used to indicate relative position relationship, and when the position of the object which is described is changed, the relative position relationship may be changed accordingly.

In a study, the inventor(s) of the present application has found that: at present, a display apparatus for preventing myopia may force the user to maintain a certain distance from the display screen by alerting the user, dimming of the display screen, or a method that the display screen does not display a pattern upon the user being too close to the display screen. This may result in a poor user experience effect.

Embodiments of the present disclosure provide a display apparatus and a display method. The display apparatus includes: a display device and an adjustable optical device. The display device includes a display screen, configured to display an image; the adjustable optical device is located at a side of the display screen which is used to display, the adjustable optical device is configured to adjust a distance between the display screen and a virtual image of the image formed by the adjustable optical device. The display apparatus can be utilized to play a role of eyesight protection, and bring a relatively good experience effect to the user.

Hereinafter, the display apparatus and display method provided by the embodiments of the present disclosure will be described with reference to the accompanying drawings.

First Embodiment

Figure 1A:
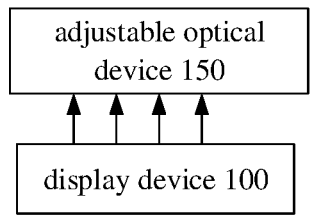
FIG. 1a is a schematic diagram of a display apparatus provided by an embodiment of the present disclosure.

The present embodiment provides a display apparatus. As illustrated by FIG. 1a, the display apparatus includes: a display device 100 and an adjustable optical device 150. The display device 100 includes a display screen, configured to display an image; the adjustable optical device 150 is located at a side of the display screen 100 which is used to display, the adjustable optical device 150 is configured to adjust a distance between a virtual image of the image formed by the adjustable optical device 150 and the display screen. The display apparatus can be utilized to play a role of eyesight protection, and bring a relatively good experience effect to the user.

Figure 1B:
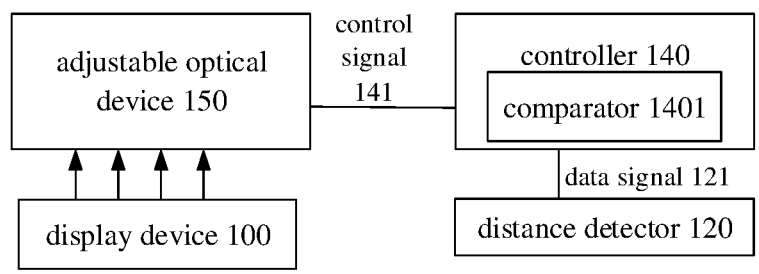
FIG. 1b is a schematic diagram of another display apparatus provided by an embodiment of the present disclosure.

For example, FIG. 1b is a schematic diagram of a display apparatus provided by an embodiment of the present disclosure, as illustrated by FIG. 1b, the display apparatus further includes a distance detector 120 and a controller 140. The distance detector 120 is configured to detect a real distance between a current user and the display screen; and the controller 140 is communicated with the distance detector 120, and configured to receive a data signal 121 detected by the distance detector 120 and judge and calculate the data signal 121 to obtain a control signal 141. The adjustable optical device 150 is communicated with the controller 140 and located at a side of the display screen 100 which is used to display. The virtual image formed by the image through the adjustable optical device is located at a position where the display screen is located or a side of the display screen away from the adjustable optical device 150. The display apparatus can be utilized to automatically adjust a distance between the virtual image of the image which is seen by a current user and the current user, i.e., the display apparatus can be utilized to realize a representation of the image, and adjust the distance between the virtual image and the human eyes to satisfy a reasonable range of a viewing distance, so as to further achieve a role of eyesight protection.

It should be noted that, the above "communicated" is shown in FIG. 1b as a connection straight line without arrows, which means that data information can be mutually transmitted or received, that is, the controller 140 receives the data signal 121 of the distance detector 120, the controller 140 transmits the control signal 141 to the adjustable optical device 150. The above "communicated" includes a wired manner (for example, connection via a cable or fiber) and a wireless manner (for example, connection via a wireless network such as wifi). The straight line with an arrow in FIG. 1a indicates that the image light emitted by the display device 100 is incident on the adjustable optical device 150; in addition, the current user refers to a person who is using the display apparatus.

For example, the display device in the present embodiment can be a display device of any display apparatuses such as a television, a mobile phone, a tablet computer, a notebook computer, or the like.

For example, the controller can be implemented in software for execution by various types of processors. For example, in a case that the controller can be implemented by using software, in consideration of the technical level of the existing hardware, those skilled in the art can build a corresponding hardware circuit to achieve the functions corresponding to functions of the controller which is implemented in software without considering the cost. The hardware circuit includes a conventional very large scale integration (VLSI) circuit, or a gate array, and existing semiconductors such as a logic chip, a transistor, or other discrete components. For example, the controller can also be implemented with a programmable hardware device, such as a field programmable gate array, programmable array logic, a programmable logic device, etc., and the present embodiment is not limited thereto.

For example, the distance detector can be an optical-type distance detector. The present embodiment, taking an infrared distance detector as an example, utilizes the principle that the reflective intensities of an infrared signal are different when the infrared signal meets barriers at different distances so as to detect a distance between the current user and the distance detection. The infrared distance detector has two parts including an infrared signal transmitter and an infrared signal receiver, and there is a certain limited viewing field between the infrared signal transmitter and the infrared signal receiver. The distance detector can detect the distance between a current user who is located in an intersection region of the transmitting viewing field and the receiving viewing field and the infrared distance detector. The embodiments are not limited thereto. For example, the distance detector can also be an ultrasonic distance transducer, which utilizes an ultrasonic probe to send an ultrasonic wave to a direction where the current user is located, starts to time from the time of sending the ultrasonic wave and stops timing until the ultrasonic wave encounters the current user and returns to the a receiver of the ultrasonic distance transducer. The distance from the current user to the display screen can be calculated and obtained according to the time recorded by the timer and propagation speed of the ultrasonic wave in the air.

It should be noted that, the distance detector is disposed in the plane where the display screen is located, and the emitted infrared ray or ultrasonic wave does not pass through the adjustable optical device, so as to detect the real distance from the current user to the display screen. For example, the distance detector can be disposed on the shell of the display apparatus, which is not limited herein.

Figure 1C:
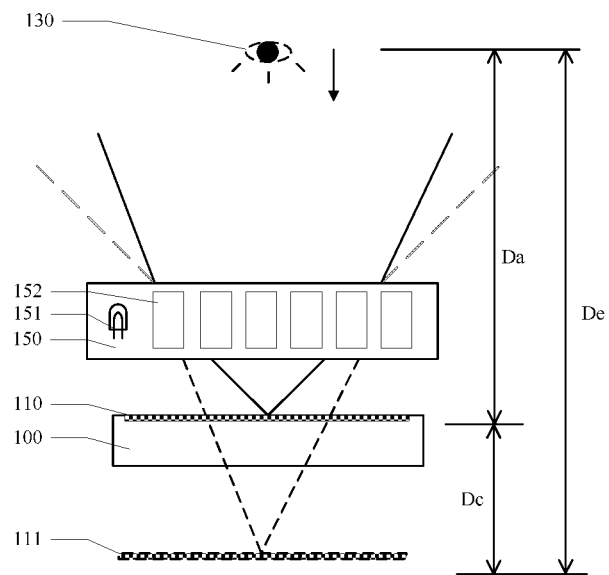
FIG. 1c is a schematic diagram of an image representation of an image on a display screen by an adjustable optical device provided by an embodiment of the present disclosure.

FIG. 1c is a schematic diagram of an image representation of an image on a display screen by an adjustable optical device provided by an embodiment of the present disclosure. As illustrated by FIG. 1c, the adjustable optical device 150 is disposed in front of the display screen 110, i.e., a side of the display screen 110 which is used to display. The image light emitted from the display screen 110 is incident on the adjustable optical device 150, and the current user 130 observes a virtual image 111 of the image presented at a position where the display screen 110 is located or the side of the display screen 110 away from the adjustable optical device 150 through the adjustable optical device 150. The virtual image 111 in the figure is represented by a dotted box filled with a pattern. It should be noted that, in an initial state, the virtual image observed by the current user is located at the position where the display screen is located.

For example, the distance between the current user 130 and the virtual image 111 is a viewing distance De, the distance between the virtual image 111 and the display screen 110 is a correction distance of the adjustable optical device 150, and the viewing distance De is a sum of the real distance Da and the correction distance. It should be noted that the real distance Da between the current user 130 and the display screen 110, which is detected by the distance detector 120, is a perpendicular distance illustrated by FIG. 1c between the current user 130 and the display screen 110. For example, the correction distance of the adjustable optical device 150 is zero, i.e., the virtual image 111 is located at a position where the display screen 110 is located. For example, the correction distance of the adjustable optical device 150 is more than zero, i.e., the virtual image 111 is located at a side of the display screen 110 away from the adjustable optical device 150.

As illustrated by FIG. 1c, a maximum correction distance of the adjustable optical device 150 is Dc, the maximum correction distance Dc is a correction distance upon the virtual image 111 being located at a furthest distance from the display screen 110, and is also a correction distance upon the virtual image 111 being located at a furthest distance from the current user 130, such that the current user can have a maximum viewing distance De. The correction distance of the adjustable optical device 150 can be adjustable within a range of 0 to Dc, so the viewing distance De can be adjustable within a range of Da to (Da+Dc) with a certain range of adjustment. It should be noted that, in the present embodiment, the position of the virtual image on the display screen is set as a closet position of the virtual image from the current user.

For example, Ds, which is two times of the diagonal size of the display screen 110, is a reasonable viewing distance that makes it difficult for human eyes to produce myopia. The range of reasonable viewing distance in the present embodiment refers to that the viewing distance De of the current user is not less than the reasonable viewing distance Ds. It should be noted that, the present embodiment takes an example that the virtual image 111 is located at the position of the display screen 110 when the display apparatus is in an initial state for description. Therefore, the controller 140 uses the real distance Da as a reference value to determine whether the viewing distance De satisfies the range of reasonable viewing distance.

For example, the maximum correction distance Dc can be not less than the reasonable viewing distance Ds, or can be less than the reasonable viewing distance Ds. Upon the maximum correction distance Dc being not less than the reasonable viewing distance Ds, the viewing distance De of the current user 130 always satisfies the range of the reasonable viewing distance. In this embodiment, a case where the maximum correction distance Dc is less than the reasonable viewing distance Ds is mainly described as an example.

For example, the controller 140 includes a comparator 1401. Before the display apparatus operates, the values of the maximum correction distance Dc and the reasonable viewing distance Ds are inputted and stored in the comparator 1401, and then the comparator 1401 performs a comparison of the numerical values of the real distance Da and Ds or Ds-Dc, so as to determine whether the viewing distance De satisfies the range of the reasonable viewing distance.

For example, after the current user 130 is located in front of the display apparatus for a certain time, for example T minutes, the distance detector 120 detects the distance of the current user 130 from the display screen 110. For example, T is 5-10, but the present embodiment is not limited thereto.

For example, the distance detector 120 (not shown in FIG. 1c) detects the distance of the current user 130 from the display screen 110, and transmits the obtained real distance Da, i.e., the data signal 121, to the controller 140 (not shown in FIG. 1c), upon the determining that Da is greater than Ds, the comparator 1401 outputs a comparison result, that is, upon the real distance of the current user 130 from the display screen 110 being greater than the reasonable viewing distance, and the distance between the current user 130 and the virtual image 111 satisfying the range of the reasonable viewing distance, the controller 140 executes a command that does not calculate the data signal 121 according to the comparison result, and the virtual image 111 of the image is still located at the position of the display screen 110, i.e., the controller 140 does not need to control the adjustable optical device 150 to adjust the viewing distance De, so as to save power.

For example, upon the current user 130 getting closer to the display apparatus, the distance detector 120 detects the real distance Da of the current user 130 from the display screen 110 and inputs the real distance Da to the comparator 1401. Upon the determining that Da is less than Ds and not less than Ds-Dc, the comparator 1401 outputs a comparison result. The controller 140 calculates the correction distance required to ensure that the viewing distance at least satisfies the reasonable viewing distance Ds according to the comparison result, introduces a control signal 141 satisfying the correction distance into the adjustable optical device 150, and controls the adjustable optical device 150 to make the viewing distance De equal the reasonable viewing distance Ds.

It should be noted that the embodiments of the present disclosure include but are not limited to the specific embodiments described above. For example, the controller can also calculate a correction distance required to make the viewing distance being greater than the reasonable viewing distance Ds, and control the adjustable optical device to make the viewing distance De greater than the reasonable viewing distance Ds. In the present embodiment, the adjustment of the adjustable optical device increases the viewing distance of the current user to achieve a purpose of satisfying the range of the reasonable viewing distance, which can not only achieve the role of eyesight protection, but also enable the current user to adjust the viewing distance without having to move by himself, so as to achieve a better experience.

FIG. 1c shows a case where the real distance Da of the current user 130 from the display screen 110 satisfies Da=Ds−Dc, i.e., a display state that the viewing distance De is a reasonable viewing distance Ds. After receiving the data signal 121 of the real distance Da detected by the distance detector 120, the controller 140 calculates that the required correction distance is the maximum correction distance Dc, and controls the adjustable optical device 150 to adjust the viewing distance De to satisfy the range of the reasonable viewing distance. In the figure, the light incident on the human eyes is represented by solid line light, and the dashed line indicates a propagation path before the light is changed.

For example, in a case where the distance of the current user 130 from the display screen 110 is too close, that is, the distance detector 120 detects the real distance Da of the current user 130 from the display screen 110 and inputs it to the controller 140, upon the comparator 1401 determining that the real distance Da is less than Ds-Dc, since the correction distance of the adjustable optical device 150 has reached the maximum correction distance Dc and the viewing distance De still cannot satisfy the reasonable viewing distance Ds, the controller 140 controls a warning lamp 151 disposed in the adjustable optical device 150 to light for reminding that the viewing distance of the current user 130 is too close and the current user 130 is required to actively increase the viewing distance De according to the comparison result. It should be noted that the maximum correction distance Dc in this embodiment is less than the reasonable viewing distance Ds. Therefore, upon the distance from the display screen of the current user is too close, the required correction distance exceeds the numerical range of the maximum correction distance Dc, and the warning lamp lights to remind the current user to actively increase the viewing distance.

Figure 2A:
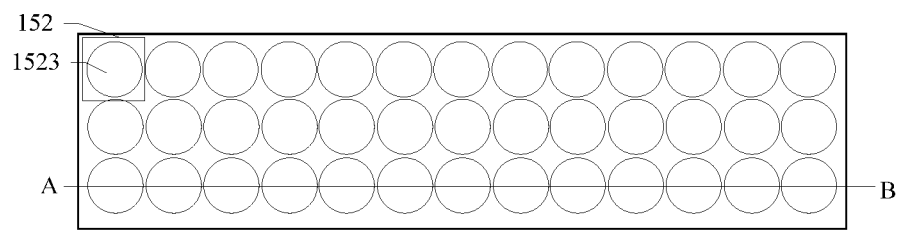
FIG. 2a is a plan view of optical elements in an adjustable optical device provided by an embodiment of the present disclosure.
Figure 2B:
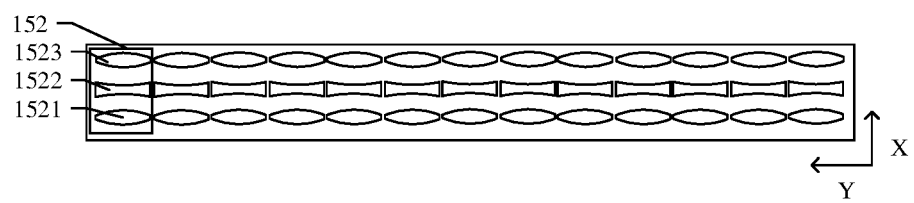

FIG. 2a is a plan view of an optical element in an adjustable optical device, and FIG. 2b is a sectional view taken along an AB direction in FIG. 2a. As illustrated in FIG. 2a, the adjustable optical device 150 includes a plurality of micro lens groups 152 disposed in an array and configured to adjust a focal length f to adjust the distance between the virtual image and the display screen. For example, the micro lens groups 152 are configured to adjust the focal length f according to the data signal 141 to adjust the distance between the current user 130 and the virtual image 111, and the distance between the display screen 110 and the micro lens groups 152 is smaller than the focal length f of the micro lens groups 152, so that the image can form an upright virtual image after passing through the micro lens groups 152. It should be noted that the focal length f of the micro lens groups 152 is an equivalent focal length of the plurality of micro lenses in the micro lens groups 152. In addition, FIG. 2a is an exemplary diagram of the micro lens groups, and the size, shape, and number of the micro lenses in the adjustable optical device can be determined according to practical requirements, which is not limited herein.

As illustrated in FIG. 2a, a plurality of micro lens groups 152 constitute a micro lens array, and each group of the plurality of micro lens groups 152 may include at least one concave lens and at least one convex lens, which is not limited herein.

For example, as illustrated in FIG. 2b, each group of the plurality of micro lens groups 152 includes a first convex lens 1521, a second convex lens 1523, and a concave lens 1522 located between the two convex lenses. At least one of the three lenses is movably disposed so that the distances among the three lenses are adjustable.

For example, as illustrated in FIG. 2b, each row of lenses arranged in the Y direction moves at the same time, and the present embodiment includes a plurality of guide rails (not shown in the figure) extending along the X direction, and each of the guide rails corresponds to one lens group. At least one lens in each micro lens group is movably disposed on a guide rail and can move along the guide rail to adjust the distance among the lenses. The present embodiment includes but is not limited thereto.

For example, as illustrated in FIG. 2b, each group of micro lens groups 152 includes a first convex lens 1521 and a second convex lens 1523 which are stationary, and a movable concave lens 1522 located between the two convex lenses. The concave lens 1522 is controlled to move in a direction close to or away from the first convex lens 1521. The present embodiment includes but is not limited thereto. For example, the concave lens 1522 can be fixed, and the first convex lens 1521 or the second convex lens 1523 can move in a direction closer to or away from the concave lens 1522.

For example, the lens is miniaturized and integrated on the glass. As illustrated in FIG. 2b, a plurality of first convex lenses 1521, a plurality of concave lenses 1522, and a plurality of second convex lenses 1523 are respectively integrated on three glasses to form three micro lens array layers. And each group of the micro lens groups 152 includes a first convex lens 1521 and a second convex lens 1523, and a concave lens 1522 located between the two convex lenses. The present embodiment is not limited thereto, for example, various combinations such as: each group of the micro lens groups may also include a convex lens and a concave lens, or each group of the micro lens groups includes a convex lens and two concave lenses can be applied to realize that an image can form an upright virtual image after passing through the micro lens groups.

Figure 3A:
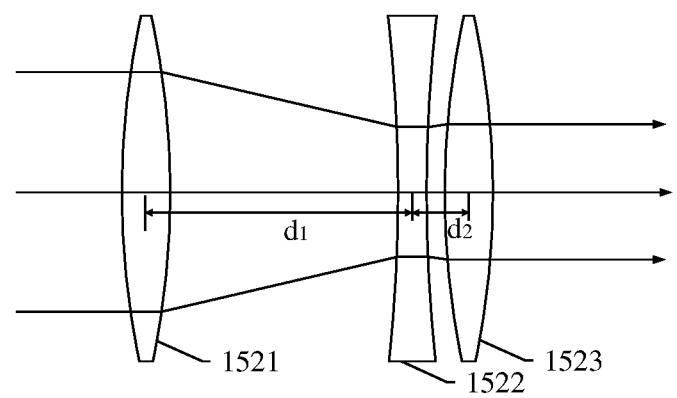
FIGS. 3a-3c are schematic diagrams of a working principle of a micro lens group provided by an embodiment of the present disclosure.
Figure 3B:
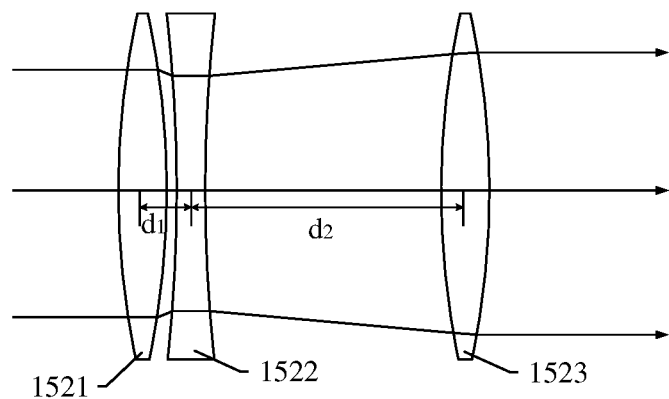
Figure 3C:
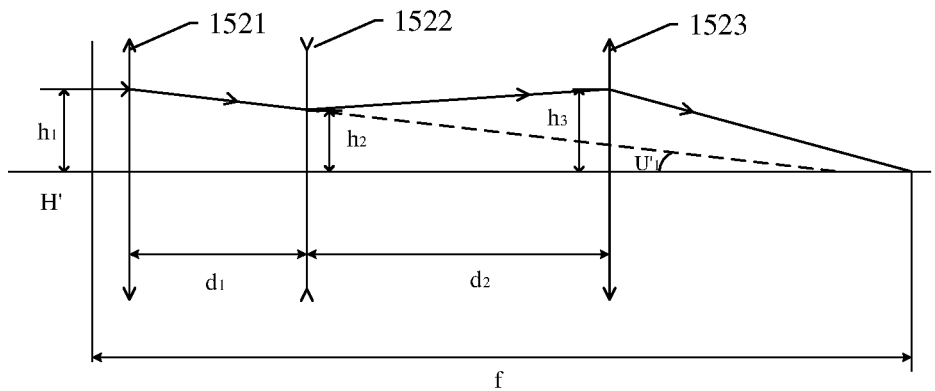

FIGS. 3a-3c are schematic diagrams illustrating the working principle of a micro lens group provided by the present embodiment. As illustrated in FIG. 3a, light is incident from the first convex lens 1521 and passes through the concave lens 1522 and exits from the second convex lens 1523. For example, the distance between the first convex lens 1521 and the second convex lens 1523 is d, the distance between the concave lens 1522 and the first convex lens 1521 is $d_1$, the distance between the concave lens 1522 and the second convex lens 1523 is $d_2$, and $d=d_1+d_2$. For example, the first convex lens 1521 and the second convex lens 1523 are fixed, i.e., the d remains unchanged, and the concave lens 1522 is controlled to move in a direction close to or away from the first convex lens 1521; that is, by reducing or increasing the $d_1$ to realize changing the focal length of the micro lens groups 152.

As illustrated in FIG. 3a, the concave lens 1522 is located farthest from the first convex lens 1521, i.e., the concave lens 1522 is located at the extreme position where the $d_1$ is maximized. At this time, the virtual image formed by the image on the display screen through the micro lens groups is closest to the current user, that is, the viewing distance of the current user is least. For example, an initial state of the micro lens group 152 is set as the state shown in FIG. 3a, and the focal lengths of the first convex lens 1521, the concave lens 1522, and the second convex lens 1523 are designed so that the virtual image formed by the image through the micro lens groups 152 is located at a position where the display screen is located. It should be noted that before adjusting the viewing distance by using the micro lens groups provided in the present embodiment, it is required to perform an optical aberration correction to the micro lens groups to meet the requirements of the overall optical design.

The present embodiment sets the virtual image closest to the current user at the position where the display screen is located, such that a largest range of the correction distance can be obtained upon the concave lens 1522 in the micro lens groups 152 being moved toward the first convex lens 1521 to the nearest position in the direction close to the first convex lens 1521. Upon the concave lens 1522 being located at the extreme position where $d_1$ is minimized, the virtual image can be adjusted to the farthest position from the display screen to obtain the maximum correction distance Dc. The present embodiment is not limited thereto, and it is also possible to design the focal lengths of micro lenses so that upon the concave lens is located at other positions, the virtual image formed by the image through the micro lens groups is located on the display screen.

As illustrated by FIG. 3b, the concave lens 1522 moves from a position away from the first convex lens 1521 to a position close to the first convex lens 1521 and reaches the extreme position close to the first convex lens 1521. During the movement of the concave lens 1522, the virtual image of the image moves from a position close to the display screen to a direction away from the display screen until it reaches the position of the maximum correction distance Dc. That is, the correction distance gradually increases to the maximum correction distance Dc, so that the viewing distance De of the current user gradually increases to the maximum value.

As shown in FIG. 3c, the focal length of the first convex lens 1521 is $f_1'$, the focal length of the concave lens 1522 is $f_2'$, and the focal length of the second convex lens 1523 is $f_3'$. The projection height of the incident light on the first convex lens 1521 is $h_1$, the projection height of the light on the concave lens 1522 passing through the first convex lens 1521 is $h_2$, and the projection height of the light on the second convex lens 1523 passing through the concave lens 1522 is $h_3$. The calculation formula of the equivalent focal length f of the micro lens groups 152 is:

$$f = \frac{h_1}{\frac{h_3}{f_3'} + \frac{h_2}{f_2'} + \frac{h_1}{f_1'}} = \frac{1}{\frac{\left(1 - \frac{d_1}{f_1'}\right)\left(1 - \frac{d_2}{f_2'}\right) - \frac{d_2}{f_2'f_1'}}{f_3'} + \frac{\left(1 - \frac{d_1}{f_1'}\right)}{f_2'} + \frac{1}{f_1'}}$$

The $f_1'$, $f_2'$ and $f_3'$ in the above formula are constant after the formation of the micro lens groups 152, the d is a fixed value and the $d_1$ and $d_2$ are variable parameters, and adjustment of the f can be achieved by adjusting the $d_1$ ($d_2$). For example, upon the concave lens 1522 moving toward the first convex lens 1521, that is, upon the $d_1$ decreasing, the focal length f of the micro lens groups 152 becomes smaller. Because the distance between the display screen and the micro lens groups 152 is smaller than the equivalent focal length f of the micro lens groups 152, therefore, upon the focal length f becoming small, the distance from the virtual image of the image to the display screen increases, that is, the correction distance from the virtual image to the display screen increases. Therefore, the viewing distance De of the current user can be increased.

The adjustable optical device provided by the present embodiment can adjust the focal length of the micro lens groups by adjusting the distances among the lenses in the micro lens groups, so as to adjust the correction distance and make the viewing distance of the current user satisfy the range of the reasonable viewing distance.

Second Embodiment

Figure 4:
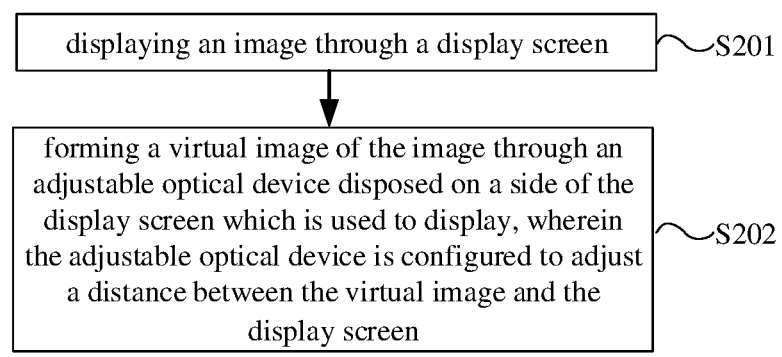
FIG. 4 is a step diagram of a display method provided by an embodiment of the present disclosure.

The present embodiment provides a display method. FIG. 4 is a step diagram of a display method provided by the embodiments of the present disclosure. As illustrated by FIG. 4, the display method includes the following steps S201-S202.

S201: displaying an image through a display screen.

For example, the display screen can be a screen on the display device. For example, the display device can be a display device of any one of the display apparatus selected from the group consisting of a television, a cellphone, a tablet computer, and a notebook computer. For example, the display screen can be a static or dynamic picture such as a picture frame or a photo album.

S202: forming a virtual image of the image through an adjustable optical device disposed on a side of the display screen which is used to display, wherein the adjustable optical device is configured to adjust a distance between the virtual image and the display screen.

For example, the display method provided by the present embodiment further includes: detecting a real distance between a current user and the display screen; and forming the virtual image of the image at a position where the display screen is located or a side of the display screen away from the adjustable optical device through the adjustable optical device, wherein the adjustable optical device adjusts a distance between the virtual image and the current user according to the real distance.

For example, a distance detector can be used to detect the real distance from the current user to the display screen, i.e., detecting the real distance between the current user and the image. For example, the distance detector can be an infrared distance detector, an ultrasonic distance detector, etc., which is not limited in the present embodiment. It should be noted that the real distance between the current user and the display screen is the perpendicular distance between the current user and the display screen, as illustrated in FIG. 1c.

For example, a detected data signal of the real distance between the display screen and the current user can be received by a controller, which can judge and calculate to obtain a control signal, and the control signal can be transmitted to the adjustable optical device to adjust the distance between the virtual image and the current user. For example, the controller may be implemented by software, so as to be executed by various types of processors, which is not limited in the present embodiment.

For example, the image light emitted by the display screen is incident on the adjustable optical device, and the current user observes a virtual image of the image which is presented at a position where the display screen is located or a side of the display screen away from the adjustable optical device through the adjustable optical device. It should be noted that, in the initial state, the virtual image observed by the current user is located at the position where the display screen is located.

For example, the distance between the current user and the virtual image is a viewing distance, the distance between the virtual image and the display screen is the correction distance of the adjustable optical device, and the viewing distance is the sum of the real distance and the correction distance. For example, the adjustable optical device has a correction distance of zero, that is, the virtual image is located at the position where the display screen is located. For example, the adjustable optical device has a correction distance greater than zero, i.e., the virtual image is located at the side of the display screen away from the adjustable optical device.

A maximum correction distance of the adjustable optical device is Dc, the maximum correction distance Dc is a correction distance upon the virtual image being located at a furthest distance from the display screen, and is also a correction distance upon the virtual image being located at a furthest distance from the current user, such that the current user can have a maximum viewing distance De. The correction distance of the adjustable optical device can be adjustable within a range of 0 to Dc, so the viewing distance De can be adjustable within a range of Da to (Da+Dc) with a certain range of adjustment. It should be noted that, in the present embodiment, the position of the virtual image on the display screen is set as a closet position of the virtual image from the current user.

For example, Ds, which is two times of the diagonal size of the display screen 110, is a reasonable viewing distance that makes it difficult for human eyes to produce myopia, and the maximum correction distance Dc is less than the reasonable viewing distance. The range of reasonable viewing distance in the present embodiment refers to that the viewing distance of the current user is not less than the reasonable viewing distance Ds. It should be noted that, in the present embodiment, a case where the virtual image is located at the position of the display screen upon being the initial state is described as an example. Therefore, the adjustable optical device uses the real distance as a reference value to determine whether the viewing distance satisfies the range of reasonable viewing distance.

For example, after the current user is located in front of the display apparatus for a certain time, for example T minutes, the distance detector detects the distance of the current user from the display screen. For example, the T is 5-10, but the present embodiment is not limited thereto.

For example, upon the real distance being greater than the reasonable viewing distance Ds, i.e., upon the viewing distance between the current user and virtual image being greater than the reasonable viewing distance, and the viewing distance between the current user and the virtual image satisfying the range of the reasonable viewing distance, the virtual image of the image is still located at the position of the display screen, i.e., the adjustable optical device is not needed to adjust the viewing distance, so as to save power.

For example, upon the current user getting closer to the display screen, upon the real distance being decreased to be less than Ds and not less than Ds-Dc, the adjustable optical device can adjust the correction distance according to a difference value between the real distance and the reasonable viewing distance Ds, i.e., adjusting the correction distance to be not less than the different value of the reasonable viewing distance Ds and the real distance, to make the adjusted viewing distance to be not less than the reasonable viewing distance. In the present embodiment, the adjustment of the adjustable optical device increases the viewing distance of the current to achieve a purpose of satisfying the range of reasonable range of viewing distance, which can not only achieve the role of eyesight protection, but also enable the current user to adjust the viewing distance without having to move by himself, so as to achieve a better experience.

For example, in a case where the distance of the current user from the display screen is too close, that is, the real distance is decreased to be less than Ds-Dc, since the correction distance of the adjustable optical device has reached the maximum correction distance Dc and the viewing distance De still cannot satisfy the reasonable viewing distance Ds, a warning lamp disposed in the adjustable optical device can light for reminding that the viewing distance of the current user is too close and the current user is required to actively increase the viewing distance.

For example, the maximum correction distance Dc can be not less than the reasonable viewing distance Ds, or can be less than the reasonable viewing distance Ds. Upon the maximum correction distance Dc being not less than the reasonable viewing distance Ds, the viewing distance De of the current user 130 always satisfies the range of the reasonable viewing distance. In this embodiment, a case where the maximum correction distance Dc is less than the reasonable viewing distance Ds is mainly described as an example.

For example, the adjustable optical device includes a plurality of micro lens groups disposed in an array and configured to adjust a focal length of the micro lens groups to adjust the distance between the virtual image and the display screen. For example, the adjustable optical device can adjust the distance between the current user and the virtual image by adjusting the focal length of the micro lens groups, and the distance between the display screen and the micro lens groups is smaller than the focal length of the micro lens groups, so that the image can form an upright virtual image after passing through the micro lens groups. It should be noted that the focal length of the micro lens groups is an equivalent focal length of the plurality of micro lenses in the micro lens groups.

For example, a plurality of micro lens groups constitute a micro lens array, and each group of the plurality of micro lens groups may include at least one concave lens and at least one convex lens, which is not limited herein.

For example, each group of the plurality of micro lens groups includes a first convex lens, a second convex lens, and a concave lens located between the two convex lenses. At least one of the three lenses is movably disposed so that the distances among the three lenses are adjustable.

For example, each of micro lens groups includes a first convex lens and a second convex lens which are stationary, and a movable concave lens located between the two convex lenses. The concave lens is controlled to move in a direction close to or away from the first convex lens, so as to adjust the focal length of the micro lens group. The present embodiment includes but is not limited thereto. For example, the concave lens can be fixed, and the first convex lens or the second convex lens can move in a direction closer to or away from the concave lens. The adjustable optical device provided by the present embodiment can adjust the focal length of the micro lens groups by adjusting the distances among the lenses in the micro lens groups, so as to adjust the correction distance and achieve the purpose of ensuring a reasonable viewing distance.

For example, the lens is miniaturized and integrated on the glass. A plurality of first convex lenses, a plurality of concave lenses, and a plurality of second convex lenses are respectively integrated on three glasses to form three micro lens array layers. And each group of the micro lens groups includes a first convex lens and a second convex lens, and a concave lens located between the two convex lenses. The present embodiment is not limited thereto, for example, various combinations such as: each group of the micro lens groups may also include a convex lens and a concave lens, or each group of the micro lens groups includes a convex lens and two concave lenses can be applied to achieve that an image can form an upright virtual image after passing through the micro lens groups.

The display method provided by the present embodiment increases the viewing distance of the current user by adjusting the adjustable optical device, to achieve a purpose of satisfying the range of the reasonable viewing distance, which can not only achieve the role of eyesight protection, but also enable the current user to adjust the viewing distance without having to move by himself, so as to achieve a better experience.

Third Embodiment

The present embodiment provides a display device. As illustrated by FIG. 1b, the display device includes: a display device 100, a distance detector 120, a controller 140, and an adjustable optical device 150. The display device 100 includes a display screen which is configured to display an image; the distance detector 120 is configured to detect a real distance between a current user and the display screen; the controller 140 is communicated with the distance detector 120 and configured to receive a data signal 121 detected by the distance detector 120, and judge and calculate the data signal 121 to obtain a control signal 141. The adjustable optical device 150 is communicated with the controller 140 and disposed at a side of the display screen which is used to display, a virtual image of the image formed by the adjustable optical device 150 is located at a position where the display screen is located or a side of the display screen away from the adjustable optical device 150. The display apparatus can be utilized to automatically adjust the distance between the current user and the virtual image of the image seen by the current user, i.e., the display apparatus can be utilized to realize a representation of the image, and adjust the distance between the virtual image and the human eyes to satisfy a range of the reasonable viewing distance, so as to further achieve a role of eyesight protection.

The following points should to be explained:

(1) Unless otherwise defined, in the embodiments and accompanying drawings in the present disclosure, the same reference numeral represents the same meaning.

(2) The accompanying drawings involve only the structure(s) in connection with the embodiment(s) of the present disclosure, and other structure(s) can be referred to common design(s).

(3) For the purpose of clarity only, in accompanying drawings for illustrating the embodiment(s) of the present disclosure, a layer or a structure may be enlarged. It should understood that, in the case in which a component or element such as a layer, film, area, substrate or the like is referred to be "on" or "under" another component or element, it may be "directly" on or under the another component or element or a component or element is interposed therebetween.

The foregoing is only the embodiments of the present invention and not intended to limit the scope of protection of the present invention, alternations or replacements which can be easily envisaged by any skilled person being familiar with the present technical field shall fall into the protection scope of the present disclosure. Thus, the protection scope of the present disclosure should be based on the protection scope of the claims.

What is claimed is:

1. A display apparatus, comprising:
    a display device, comprising a display screen, configured to display an image;
    an adjustable optical device, located at a side of the display screen which is used to display;
    a controller, communicated with the adjustable optical device, and inputting a control signal to the adjustable optical device; and
    a distance detector, configured to detect a real distance between a current user and the display screen,
    wherein the adjustable optical device is configured to adjust a distance between the display screen and a virtual image of the image formed by the adjustable optical device according to the control signal,
    the controller is communicated with the distance detector, and configured to receive a data signal detected by the distance detector and judge and calculate the data signal to obtain the control signal,
    the adjustable optical device is configured to locate the virtual image at a position where the display screen is located or a side of the display screen away from the adjustable optical device, and adjust a distance between the virtual image and the current user according to the control signal,
    wherein the distance between the current user and the virtual image is a viewing distance, the distance between the virtual image and the display screen is a correction distance of the adjustable optical device, and the viewing distance is a sum of the real distance and the correction distance,
    a maximum correction distance of the adjustable optical device is Dc, and Ds is two times of a diagonal of the display screen,
    the controller comprises a comparator, the comparator is configured to output a comparison result upon determining that the real distance is less than the Ds and not less than Ds−Dc, and the controller controls the adjustable optical device to make the viewing distance not less than the Ds according to the comparison result.

2. The display apparatus according to claim 1, wherein the Dc is less than the Ds;
    the adjustable optical device comprises a warning lamp, the controller comprises a comparator, the comparator is configured to output a comparison result upon determining that the real distance is less than Ds−Dc, and the controller controls the warning lamp to light for warning according to the comparison result.

3. The display apparatus according to claim 1, wherein the adjustable optical device comprises a plurality of micro lens groups arranged in an array, the plurality of micro lens groups are configured to adjust a focal length to adjust the distance between the virtual image and the display screen, and a distance between the display screen and the plurality of micro lens groups is less than the focal length of the plurality of micro lens groups.

4. The display apparatus according to claim 3, wherein each group of the plurality of micro lens groups comprises a first convex lens, a second convex lens, and a concave lens between the two convex lenses, and at least one of the three lenses is movably disposed to make distances among the three lenses adjustable.

5. The display apparatus according to claim 4, wherein each group of the plurality of micro lens groups comprises the first convex lens and the second convex lens which are stationary, and the concave lens which is movable, and the concave lens is configured to move along a direction going close or away from the first convex lens.

6. A display method, comprising:
    displaying an image through a display screen;
    forming a virtual image of the image through an adjustable optical device disposed on a side of the display screen which is used to display, wherein the adjustable optical device is configured to adjust a distance between the virtual image and the display screen,
    detecting a real distance between a current user and the display screen; and
    forming the virtual image of the image at a position where the display screen is located or a side of the display screen away from the adjustable optical device through the adjustable optical device, wherein the adjustable optical device adjusts a distance between the virtual image and the current user according to the real distance,
    wherein the distance between the current user and the virtual image is a viewing distance, the distance between the virtual image and the display screen is a correction distance of the adjustable optical device, and the viewing distance is a sum of the real distance and the correction distance, a maximum correction distance of the adjustable optical device is Dc, and Ds is two times of a diagonal of the display screen, upon the real distance being greater than the Ds, the virtual image is located at the position where the display screen is located.

7. The display method according to claim 6, wherein upon the real distance being less than the Ds and not less than Ds−Dc, the adjustable optical device adjusts the viewing distance to be not less than the Ds according to the real distance.

8. The display method according to claim 6, wherein the adjustable optical device comprises a warning lamp, and the Dc is less than the Ds, upon the real distance being less than Ds−Dc, the warning lamp lights for warning.

9. The display method according to claim 6, wherein the adjustable optical device comprises a plurality of micro lens groups arranged in an array, the distance between the virtual image and the display screen is adjusted by adjusting a focal length of the plurality of micro lens groups, and a distance between the display screen and the plurality of micro lens groups is less than the focal length of the plurality of micro lens groups.

10. The display method according to claim 9, wherein each group of the plurality of micro lens groups comprises a first convex lens, a second convex lens, and a concave lens between the two convex lenses, and at least one of the three lenses is movably disposed to make distances among the three lenses adjustable.

11. The display method according to claim 10, wherein each group of the plurality of micro lens groups comprises the first convex lens and the second convex lens which are stationary, and the concave lens which is movable, and the concave lens is controlled to move along a direction going close or away from the first convex lens to adjust the focal length.

* * * * *

UNITED STATES PATENT AND TRADEMARK OFFICE
CERTIFICATE OF CORRECTION

PATENT NO. : 10,969,580 B2  
APPLICATION NO. : 15/770981  
DATED : June 9, 2020  
INVENTOR(S) : Peng Wu Page 1 of 1

It is certified that error appears in the above-identified patent and that said Letters Patent is hereby corrected as shown below:

On the Title Page

(22) PCT Filed should read: Sep 22, 2017

Signed and Sealed this  
Third Day of August, 2021

Drew Hirshfeld  
*Performing the Functions and Duties of the*  
*Under Secretary of Commerce for Intellectual Property and*  
*Director of the United States Patent and Trademark Office*